UNITED STATES PATENT OFFICE 2,322,035

CYANOETHYL ALPHA CHLORACRYLATE

Joy G. Lichty, Stow, Ohio, assignor to Wingfoot Corporation, Wilmington, Del., a corporation of Delaware No Drawing. Application June 30, 1942,
Serial No. 449,186

1 Claim. (Cl. 260—464)

This invention relates to cyanoethyl-alpha-chloroacrylate. It is a useful component of polymerization reactions. On copolymerization with various monomers it yields useful copolymers. It may be prepared as follows:

A mixture of 143 g. alpha, beta-dichloropropionic acid, 80 g. ethylene cyanohydrin, 1 g. paratoluene sulphonic acid and 250 cc. benzene was treated in the usual manner to remove the water. The residue was treated to remove the unreacted acid and cyanohydrin. On heating to distill decomposition occurred. Using a soda lime tower a pressure of 3 mm. was maintained, and a fraction boiling at 93–118° C. was obtained. This was identified by analysis as cyanoethyl-alpha-chloroacrylate, and not the dichloropropionate as might have been expected.

Analysis

| Element | Per cent found | Per cent calculated |
|---------|----------------|---------------------|
| N       | 9.54; 9.64     | 8.8                 |
| Cl      | 21.32; 21.58   | 22.2                |

What I claim is:
Cyanoethyl-alpha-chloroacrylate.

JOY G. LICHTY.